United States Patent
Chiba et al.

(10) Patent No.: US 12,152,289 B2
(45) Date of Patent: Nov. 26, 2024

(54) TITANIUM ALLOY ADDITIVE MANUFACTURING PRODUCT AND METHOD OF MANUFACTURING THE SAME

(71) Applicants: TOHOKU UNIVERSITY, Sendai (JP); JAMPT CORPORATION, Tagajo (JP)

(72) Inventors: Akihiko Chiba, Sendai (JP); Noritaka Yasuda, Tagajo (JP)

(73) Assignees: TOHOKU UNIVERSITY, Sendai (JP); JAMPT CORPORATION, Tagajo (JP)

( * ) Notice: Subject to any disclaimer, the term of this patent is extended or adjusted under 35 U.S.C. 154(b) by 184 days.

(21) Appl. No.: 17/427,840

(22) PCT Filed: Jan. 31, 2020

(86) PCT No.: PCT/JP2020/003792
§ 371 (c)(1),
(2) Date: Aug. 2, 2021

(87) PCT Pub. No.: WO2020/158945
PCT Pub. Date: Aug. 6, 2020

(65) Prior Publication Data
US 2022/0127698 A1   Apr. 28, 2022

(30) Foreign Application Priority Data
Feb. 1, 2019   (JP) .................. 2019-017260

(51) Int. Cl.
*C22C 14/00* (2006.01)
*B22F 9/10* (2006.01)
(Continued)

(52) U.S. Cl.
CPC ............... *C22C 14/00* (2013.01); *B22F 9/10* (2013.01); *B33Y 40/10* (2020.01); *B33Y 70/00* (2014.12);
(Continued)

(58) Field of Classification Search
CPC ................................................ C22C 14/00
See application file for complete search history.

(56) References Cited

U.S. PATENT DOCUMENTS
2020/0360992 A1   11/2020   Sakamaki et al.

FOREIGN PATENT DOCUMENTS
CN   108380895 A   *   8/2018
JP   H10-251778 A       9/1998
(Continued)

OTHER PUBLICATIONS
Antonysamy, Microstructure, Texture and Mechanical Property Evolution during Additive Manufacturing of Ti6A1AV Alloy for Aerospace Applications, 2012, [retrieved online Apr. 22, 2014] https://www.escholar.manchester.ac.uk/api/datastream?publicationPid=US-ac-man-scw:160535&datastreamId=FULL-TEXT.PDF (Year: 2012).*
(Continued)

*Primary Examiner* — Keith D. Hendricks
*Assistant Examiner* — Joshua S Carpenter
(74) *Attorney, Agent, or Firm* — Oliff PLC

(57) ABSTRACT

A titanium alloy additive manufacturing product contains 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities, in which a pore content is 0.05 number/mm$^2$ or less, and a tensile strength is 855 MPa or more.

3 Claims, 2 Drawing Sheets

(51) Int. Cl.
B33Y 40/10 (2020.01)
B33Y 70/00 (2020.01)

(52) U.S. Cl.
CPC ..... *B22F 2301/205* (2013.01); *B22F 2304/10* (2013.01)

(56) References Cited

FOREIGN PATENT DOCUMENTS

| JP | 2016-053198 A | 4/2016 |
| JP | 2017-048410 A | 3/2017 |
| WO | 2019/124047 A1 | 6/2019 |

OTHER PUBLICATIONS

Al-Bermani, S. S., et al. "The origin of microstructural diversity, texture, and mechanical properties in electron beam melted Ti—6Al—4V." Metallurgical and materials transactions a 41 (2010): 3422-3434. (Year: 2010).*

PE2E machine translation of CN-108380895-A retrieved on Jun. 13, 2024. (Year: 2018).*

Sep. 16, 2022 Extended Search Report issued in European Patent Application No. 20749460.0.

Mohammadhosseini et al., "Microstructure and Mechanical Properties of Ti—6Al—4V Manufactured by Electron Beam Melting Process," Materials Research Innovations, 2013, vol. 17, No. sup2, pp. S2-106-S2-112.

Antonysamy, Microstructure, Texture and Mechanical Property Evolution during Additive Manufacturing of Ti6A1AV Alloy for Aerospace Applications, 2012, [retrieved online Apr. 22, 2014] https://www.escholar.manchester.ac.uk/api/datastream?publicationPid=US-ac-man-scw:160535&datastreamId=FULL-TEXT.PDF.

Cunningham et al., "Analyzing the Effects of Powder and Post-Processing on Porosity and Properties of Electron Beam Melted Ti—6A1—4V", Materials Research Letters, 2017, vol. 5, No. 7, pp. 516-525.

Apr. 21, 2020 International Search Report issued in International Patent Application No. PCT/JP2020/003792.

Adachi et al.; "Formation of light metal using additive manufacturing method"; Journal of The Japan Institute of Light Metals; 2016; vol. 66; No. 7; pp. 360-367.

Shui et al.; "Effects of post-processing on cyclic fatigue response of a titanium alloy additively manufactured by electron beam melting"; Materials Science & Engineering A; 2017; vol. 680; pp. 239-248.

Morokoshi et al.; "Mechanical Properties of Ti—6Al—4V Materials Prepared by Additive Manufacturing Technology and HIP Process"; J. Jpn Soc. Powder Powder Metallurgy; 2014; vol. 61. No. 5; pp. 250-254.

Gerling et al.; "Porosity and argon concentration in gas atomized y-TiAl powder and hot isostatically pressed compacts"; Materials Science and Engineering; 1998; vol. A252; pp. 239-247.

Chen et al.; "A pore morphological study of gas-atomized Ti—6Al—4V powders by scanning electron microscopy and synchrotron X-ray computer tomography"; Powder Technology; 2018; vol. 330. pp. 425-430.

Chen et al.; "A comparative study of Ti—6Al—4V powders for additive manufacturing by gas atomization, plasma rotating electrode process and plasma atomization"; Powder Technology; 2018; vol. 333; pp. 38-46.

Isonishi et al.; "Production of Ti-alloy Powder by Rotating Electrode Process"; Iron and Copper; 1990; vol. 76; pp. 2108-2115.

* cited by examiner

TITANIUM ALLOY ADDITIVE MANUFACTURING PRODUCT AND METHOD OF MANUFACTURING THE SAME

TECHNICAL FIELD

The present invention relates to a titanium alloy additive manufacturing product having a high fatigue strength and a method of manufacturing the same. In particular, the present invention relates to a titanium alloy additive manufacturing product which is a product as built by a metal additive manufacturing method and has a fatigue strength without being subjected to a HIP treatment, and a method of manufacturing the same.

BACKGROUND ART

A titanium alloy has a high tensile strength while being lightweight and thus has been widely used in an aircraft part and the like. In this case, the titanium alloy is usually subjected to processing such as rolling after being cast.

On the other hand, a metal additive manufacturing method has recently attracted attention as a method of manufacturing a product having a final shape by using a metal powder as a raw material, spreading the metal powder layer by layer, irradiating the metal powder with a laser or an electron beam, and heating, dissolving, and solidifying only a specific part without using a mold.

The titanium alloy is also an alloy suitable for such a metal additive manufacturing method, and an additive manufacturing product obtained by the metal additive manufacturing method exhibits a high tensile strength equal to or higher than that of a molded body obtained by casting and rolling without rolling or the like (see Non Patent Literature 1).

However, in a case where a metal powder obtained by a gas atomization method (hereinafter, referred to as a gas atomized powder) is used as a raw material and a metal additive manufacturing product is formed by irradiation with an electron beam, when a fatigue test is performed on a material as additive manufactured (as built) without being subjected to a treatment, a fatigue strength is 500 MPa or less, which is low, in many cases due to the influence of defects inside the metal additive manufacturing product. It has been reported that the fatigue strength ($10^7$ cycles) is improved and increased up to 600 MPa by subjecting such a material as additive manufactured (as built) to a HIP treatment (see Non Patent Literature 2).

In addition, it has been reported that the fatigue strengths ($10^7$ cycles) of the materials as additive manufactured of the additive manufacturing product obtained by an electron beam method and a laser method are 240 MPa and 300 MPa, respectively, which are low, but are increased to 580 MPa by a HIP treatment (see Non Patent Literature 3).

Furthermore, in the metal powder obtained by the gas atomization method using argon gas, it is known that a proportion of particles having a higher pore (cavity) volume ratio increases as a particle size of a powder particle increases, and a large amount of argon gas is contained in the pores (see Non Patent Literatures 4 and 5).

In addition, in the metal powder generated by a rotating electrode method, it is known that the number of particles having pores (cavities) is significantly reduced as compared with the gas atomized powder, but the larger the powder particle size is, the larger the pore (cavity) volume ratio is (for example, see Non Patent Literature 6).

These phenomena are considered to be due to the fact that a shape of a droplet is easily deformed as a particle size of the droplets scattered at the time of powder production is larger, and thus, the droplets are likely to wrap an inert gas present in the environment at the time of powder production.

In addition, it has been reported that a material obtained by subjecting a sintered body of a metal powder having a particle size of 271 μm manufactured using a rotating electrode process method (PREP method) to a HIP treatment exhibits excellent fatigue characteristics (durability fatigue limit ratio: fatigue strength σ/tensile strength σB is 0.63) as compared with a forged material (see Non Patent Literature 7).

A metal additive manufacturing product obtained using the gas atomized powder as the raw material powder by an electron beam or a laser disclosed in the above-described non patent literatures generally exhibits excellent characteristics.

For example, the titanium alloy additive manufacturing product disclosed in Non Patent Literature 1 exhibits high tensile properties and high elongation equal to or higher than those of a rolled or forged material obtained by a manufacturing method according to the related art.

In addition, as for the tensile strength of the metal additive manufacturing product obtained using the gas atomized powder as a raw material described in each of Non Patent Literature 2 and Non Patent Literature 3, when comparing the material as additive manufactured and the HIP-treated material with each other, there is a large difference in tensile strength, yield strength, and elongation. That is, the HIP-treated material has improved elongation but low tensile strength and yield strength as compared with the material as additive manufactured. In addition, since the HIP treatment is performed under a high temperature and a high pressure, a treatment cost of the laminate is high, and thus, a product cost is high.

Furthermore, it has been reported that the HIP-treated material of the sintered body of the metal powder obtained by the rotating electrode method described in Non Patent Literature 7 exhibits a high fatigue strength as compared with the forged material, but a high fatigue strength cannot be obtained because the powder itself is not sintered unless the powder is subjected to the HIP treatment. In addition, since a high temperature and a high pressure are required in the HIP treatment, a treatment cost of the laminate is high, and thus, a product cost is high.

CITATION LIST

Non Patent Literature

Non Patent Literature 1: Mitsuru ADACHI et al., Light Metals, 66 (2016), 360-367

Non Patent Literature 2: Xiaoli Shui etc, Materials Science & Engineering A 680 (2017), 239-248

Non Patent Literature 3: Shotaro MOROKOSHI et al., Powder and Powder Metallurgy, 61 (2014), 250-254

Non Patent Literature 4: R. Gering etc, Materials Science & Engineering A 252 (1998), 239-247

Non Patent Literature 5: G. Chen etc, Powder Technology 330 (2018), 425-430

Non Patent Literature 6: G. Chen etc, Powder Technology 333 (2018), 38-46

Non Patent Literature 7: Kazuo ISONISHI and Masaharu TOKIZANE, Iron and Steel, (1990), 2108-2115

SUMMARY OF INVENTION

Technical Problem

The present invention has been made from the above background. That is, since the metal additive manufacturing product has a rapidly-solidified structure, the metal additive manufacturing product exhibits a micro structure that cannot be obtained by a method according to the related art, and thus, a high value of the tensile strength is exhibited. However, in a case where the gas atomized powder is additive manufactured, since few pores are present in the metal additive manufacturing product, fatigue characteristics which are easily affected by even slight defects are low. As described above, it has been reported that the HIP treatment is performed in order to improve such fatigue characteristics. However, since a high cost is required in the HIP treatment, it is desired to obtain excellent fatigue characteristics without performing the HIP treatment.

An object of the present invention is to provide a titanium alloy additive manufacturing product having an excellent fatigue strength without performing a HIP treatment while maximizing characteristics of an additive manufacturing product such as a high tensile strength, and a method of manufacturing the same.

More specifically, an object of the present invention is to provide a titanium alloy (Ti-6Al-4V) additive manufacturing product which has a tensile strength equal to or higher than that of an additive manufacturing product as additive manufactured (as built) using a gas atomized powder as a raw material and exhibits a fatigue strength that is higher than that of the additive manufacturing product as additive manufactured (as built) using the gas atomized powder as a raw material and is 80% or more that of a HIP-treated material, and a method of manufacturing the same.

Note that the tensile strength equal to or higher than that of the additive manufacturing product as additive manufactured (as built) using the gas atomized powder as a raw material means 95% or more of a representative value of 900 MPa of the tensile strength of the titanium alloy (Ti-6Al-4V) additive manufacturing product.

Solution to Problem

A first aspect of the present invention is to provide a titanium alloy additive manufacturing product containing 5.50 to 6.75 wt % of Al, 3.50 to 4.50 wt % of V, 0.20 wt % or less of 0, 0.40 wt % or less of Fe, 0.015 wt % or less of H, 0.08 wt % or less of C, 0.05 wt % or less of N, and inevitable impurities, in which a pore content is 0.05 number/mm$^2$ or less, and a tensile strength is 855 MPa or more.

In the titanium alloy additive manufacturing product according to the first aspect of the present invention, the tensile strength can be set to be equal to or higher than that of an additive manufacturing product as additive manufactured (as built) using a gas atomized powder as a raw material, and a fatigue strength can be set to be 80% or more of a fatigue strength of a HIP-treated material of an additive manufacturing product obtained using a gas atomized powder as a raw material.

In addition, the fatigue strength for 10$^7$ cycles can be achieved 500 MPa or more.

A second aspect of the present invention is to provide a method of manufacturing a titanium alloy additive manufacturing product, the method including additive manufacturing a titanium alloy powder in which a proportion of powder particles having pores is 0.1% or less by a metal additive manufacturing method, the titanium alloy additive manufacturing product containing 5.50 to 6.75 wt % of Al, 3.50 to 4.50 wt % of V, 0.20 wt % or less of 0, 0.40 wt % or less of Fe, 0.015 wt % or less of H, 0.08 wt % or less of C, 0.05 wt % or less of N, and inevitable impurities.

In the method of manufacturing a titanium alloy additive manufacturing product according to the second aspect of the present invention, a particle size of the titanium alloy powder can be 30 to 250 μm.

In addition, the alloy powder can be produced using a rotating electrode method.

Advantageous Effects of Invention

According to the present invention, it is possible to provide a titanium alloy additive manufacturing product having an excellent fatigue strength without performing a HIP treatment while maximizing characteristics of an additive manufacturing product such as a high tensile strength, and a method of manufacturing the same.

In particular, according to the present invention, it is possible to provide a titanium alloy additive manufacturing product having a tensile strength that is equal to or higher than that of a material as additive manufactured (as built) of an additive manufacturing product obtained using a gas atomized powder as a raw material and having a fatigue strength that is higher than that of a material as additive manufactured (as built) of an additive manufacturing product obtained using a gas atomized powder as a raw material and is comparable to that of a HIP-treated material, and a method of manufacturing the same.

MODE FOR CARRYING OUT THE INVENTION

Figure 1:
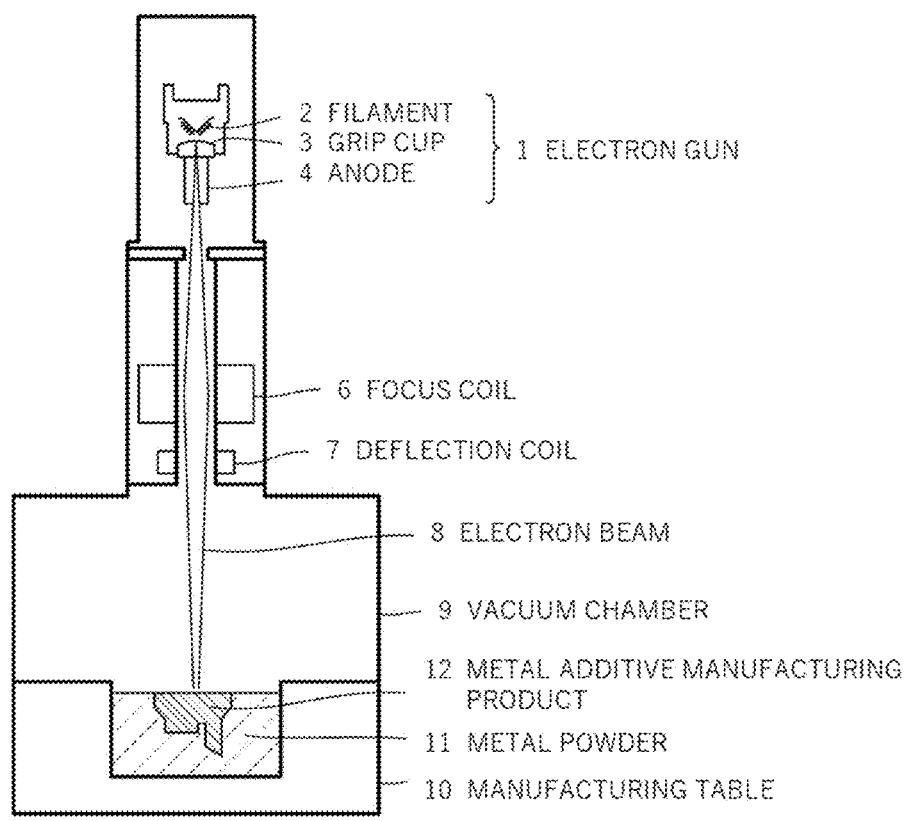
FIG. 1 is a view illustrating an electron beam additive manufacturing apparatus.

Hereinafter, embodiments of the present invention will be described in detail.

As described above, since the metal additive manufacturing product has a rapidly-solidified structure and exhibits a micro structure that cannot be obtained by a method according to the related art, the metal additive manufacturing product exhibits a high tensile strength, but has low fatigue characteristics when pores are present in the metal additive manufacturing product.

Here, as for the timing of the generation of the pores in the additive manufacturing product, the following two can be considered.

The time of the generation of one pore is the time of additive manufacturing, and a) it is considered that the pore is caused by an unmelted powder generated due to inappropriate additive manufacturing conditions. In this case, the pore is not merely one unmelted particle, but becomes a complicated and coarse pore. In addition, b) the pores may be generated due to entrained gas in a case of a laser method mainly using an inert gas in an environment in the apparatus.

The pore of a) can be solved by appropriately setting additive manufacturing conditions at the time of additive manufacturing. The pores of b) can be solved by adopting an electron beam method in which gas entrainment is prevented because it is performed in a vacuum atmosphere.

Another time of the generation of the pores is a time before additive manufacturing, and pores are already present in the raw material powder obtained by the gas atomization method. The gas wrapped in the droplets scattered at the stage of producing the raw material powder is entrained in the powder, and once the gas is entrained, the gas enters the additive manufacturing product regardless of the presence or absence of the additive manufacturing conditions. In order to prevent this, a metal powder obtained by a rotating electrode method instead of the gas atomization method may be used.

Note that the rotating electrode method is a method of obtaining a metal powder by melting a material metal by plasma and blowing off the material metal from an electrode surface as droplets by a centrifugal force.

The pores in the additive manufacturing product can be reduced by any one or a combination of the appropriate additive manufacturing conditions, the additive manufacturing by the electron beam method, and the use of the raw material powder obtained by the rotating electrode method described above.

A titanium alloy additive manufacturing product according to an embodiment of the present invention is obtained by additive manufacturing a titanium alloy powder. As an additive manufacturing method, a powder bed fusion method can be used. The powder bed fusion method is an additive manufacturing method in which a raw material metal powder is spread layer by layer, the raw material metal powder is irradiated with a laser or an electron beam, and only a specific part is dissolved and solidified.

The obtained additive manufacturing product has a composition containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

The titanium alloy additive manufacturing product has a pore content of 0.05 number/mm$^2$ or less and preferably 0.03 number/mm$^2$ or less. The pore content is a factor having a large influence on the fatigue strength after metal additive manufacturing. When the pores having a pore content of more than 0.05 number/mm$^2$ are present in the additive manufacturing product, the number of starting points of fracture increases, and fatigue fracture easily proceeds. Therefore, in order to increase the fatigue strength, the pore content in the additive manufacturing product needs to be 0.05 number/mm$^2$ or less.

As described above, a tensile strength of the titanium alloy additive manufacturing product having the above alloy composition and the pore content of 0.05 number/mm$^2$ or less is equal to higher than that of a material as additive manufactured (as built) of an additive manufacturing product obtained using a gas atomized powder as a raw material, and a fatigue strength of the titanium alloy additive manufacturing product is 80% or more of a fatigue strength of a HIP-treated material of an additive manufacturing product obtained using a gas atomized powder as a raw material.

In addition, the titanium alloy additive manufacturing product having the above alloy composition and the pore content of 0.05 number/mm$^2$ or less has a fatigue strength for $10^7$ cycles of 500 MPa or more.

A method of manufacturing a titanium alloy additive manufacturing product according to a second embodiment of the present invention includes additive manufacturing a titanium alloy powder by a metal additive manufacturing method. The titanium alloy powder used as a raw material has a composition containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

In addition, a proportion of powders having pores in the titanium alloy powder is 0.1% or less and preferably 0.05% or less.

The proportion of the pores in the titanium alloy powder is a factor having a large influence on the fatigue strength after metal additive manufacturing. The pores in the titanium alloy powder are present as they are also in the additive manufacturing product formed by additive manufacturing the titanium alloy powders. Accordingly, when a volume content of the pores in the titanium alloy powder is more than 0.1, the pores in the additive manufacturing product serve as starting points of the fatigue fracture. Therefore, in order to obtain an additive manufacturing product having a high fatigue strength, the proportion of the powders having the pores in the titanium alloy powder needs to be 0.1% or less.

As described above, a particle size of the titanium alloy powder affects the presence of the pores in the additive manufacturing product. The particle size of the titanium alloy powder is preferably 30 to 250 μm and more preferably 40 to 150 μm. When a particle size of an alloy powder particle is less than 30 μm, in a case of an electron beam additive manufacturing apparatus, since the atmosphere in the apparatus is vacuum, the titanium alloy powder is sucked into the apparatus, which causes failure of a vacuum system of the apparatus. In addition, since the fluidity of the powder is also reduced, the particle size of the titanium alloy powder is preferably 30 μm or more and more preferably 40 μm or more.

On the other hand, more pores are entrained in the powder as the powder becomes larger during powder production. Therefore, the particle size of the titanium alloy powder is preferably 250 μm or less and more preferably 150 μm or less. In addition, a surface roughness of the additive manufacturing product becomes coarser as the particle size of the titanium alloy powder particle is larger, and in a product to be used as the additive manufacturing product as it is, since a roughness thereof causes a decrease in values of the tensile strength and the fatigue strength. Therefore, the particle size of the titanium alloy powder particle is preferably 250 μm or less and more preferably 150 μm or less.

The titanium alloy powder is preferably produced by a rotating electrode method. The titanium alloy powder produced by the rotating electrode method is suitable for use in an additive manufacturing method from the viewpoints of a small number of pores in the powder particle, a particle size, sphericity, a small amount of satellite spheres generated, and a small amount of oxide, and the additive manufacturing product obtained using the titanium alloy powder exhibits a high fatigue strength without the HIP treatment. Note that the environment in the apparatus during powder production by the rotating electrode method is an inert gas atmosphere, but it is preferable to maintain the atmosphere at, for example, about 1 to 2 atm in order to prevent air from entering the environment in the apparatus.

Note that, even in a method other than the rotating electrode method, the same fatigue characteristics as those in the present invention may be exhibited as long as the number of pores in the additive manufacturing product is small. For example, a "centrifugal force rotating disk method" in which droplets are dropped onto a disk-shaped disk rotating at a high speed to generate a spherical powder at an edge of the disk, an "electromagnetic induction heating type gas atomization method" in which argon gas collides with a liquid obtained by melting a rod-shaped raw material rotating at a low speed by an induction coil disposed outside the rod-shaped raw material to form a powder, and the like may also be applied.

The titanium alloy powder described above is additive manufactured by a metal additive manufacturing method, and examples of the metal additive manufacturing method include an electron beam additive manufacturing method and a laser additive manufacturing method.

In general, the electron beam additive manufacturing method is performed by the following steps using an electron beam additive manufacturing apparatus illustrated in FIG. 1.

(1) One metal powder layer having a constant thickness is spread.
(2) A location to be solidified of the metal powder layer is locally irradiated with an electron beam to heat the powder layer, and the powder is instantaneously solidified while being instantaneously melted. In this case, the electron beam is scanned based on 3D data and slice data.
(3) A manufacturing table is lowered, and the metal powder layer is further spread.
(4) The above steps are repeated to sequentially additive manufacture a metal so as to obtain an additive manufacturing product having a final shape, and then, an unsolidified powder is removed to obtain an additive manufacturing product.

By subjecting the titanium alloy powder to the above steps, a titanium alloy additive manufacturing product having a predetermined shape can be obtained.

The electron beam additive manufacturing apparatus has a structure illustrated in FIG. 1 and includes an electron gun 1, a focus coil 6, a deflection coil 7, and a vacuum chamber 9, and the inside of the apparatus is maintained in vacuum. The electron gun 1 includes a filament 2 that emits electrons, a grip cup 3 that extracts the electrons, and an anode 4 that accelerates the electrons.

In the electron gun 1, the electrons are extracted from the filament 2 heated to 2,500° C. or higher by the grip cup 3, the electrons are accelerated to half the speed of light after passing through the anode 4, and one layer of metal powder 11 is irradiated with an electron beam 8. The metal powder 11 is, for example, a titanium powder having a particle size of 65 μm, and is accommodated in a manufacturing table disposed in the vacuum chamber 9. At this time, the electron beam 8 is focused on the metal powder 11 by the focus coil 6, and is scanned into a predetermined shape based on 3D data and slice data by the deflection coil 7.

When the layered metal powder 11 is irradiated with the electron beam 8, kinetic energy thereof is converted into heat, and the metal powder is heated and melted by the heat, and then rapidly solidified. The layered metal powder 11 is further spread thereon, the same steps are repeated to add the metal, and a final product having a predetermined shape is formed.

The metal additive manufacturing can also be performed by a laser additive manufacturing method using a laser additive manufacturing apparatus. In the laser additive manufacturing method, a light emitting laser generated by a laser additive manufacturing apparatus, for example, a Yb laser apparatus is radiated to a metal powder by controlling an irradiation position by a galvanometer mirror. In the operation procedure, the spread layered metal powder is irradiated with a laser through the galvanometer mirror, and only the irradiated position is melted and solidified, and this operation is repeated to laminate the powder so as to obtain a metal additive manufacturing product having a predetermined shape.

EXAMPLES

Hereinafter, Examples of the present invention will be described in comparison with Comparative Examples.

Examples 1, 2, and 4

A additive manufacturing product having a diameter of 10 mm and a height of 100 mm was prepared by an electron beam additive manufacturing method using the titanium alloy powder (Ti-6Al-4V) having the particle size (50% cumulative particle size and particle size range) shown in Table 1, manufactured by a rotating electrode method, and a tensile test piece having a gauge length of 30 mm and a gauge diameter of 6 mm was cut out from the additive manufacturing product.

Note that the manufacturing environment by the rotating electrode method was an argon atmosphere at 1.5 atm.

Similarly, an additive manufacturing product having a diameter of 18 mm and a length of 160 mm was prepared by an electron beam additive manufacturing method, and a fatigue test piece having a gauge length of 15 mm and a gauge diameter of 6 mm was cut out from the additive manufacturing product.

Example 3

A additive manufacturing product was prepared in the same manner as those of Examples 1, 2, and 4 by a laser method using the titanium alloy powder (Ti-6Al-4V) having the particle size (50% cumulative particle size and particle size range) shown in Table 1, manufactured by a rotating electrode method, and a tensile test piece and a fatigue test piece were cut out from the additive manufacturing product in the same manner as those of Examples 1, 2, and 4.

Comparative Example 1

A additive manufacturing product was prepared in the same manner as those of Examples 1, 2, and 4 by an electron beam additive manufacturing method using the titanium alloy powder (Ti-6Al-4V) having the particle size (50% cumulative particle size and particle size range) shown in Table 1, manufactured by a gas atomization method, and a tensile test piece and a fatigue test piece were cut out from the additive manufacturing product in the same manner as those of Examples 1, 2, and 4.

Comparative Example 2

A additive manufacturing product was prepared in the same manner as those of Examples 1, 2, and 4 by an electron beam additive manufacturing method using the titanium alloy powder (Ti-6Al-4V) having the particle size (50% cumulative particle size and particle size range) shown in Table 1, manufactured by a gas atomization method, and the additive manufacturing product was subjected to a HIP treatment. A tensile test piece and a fatigue test piece were cut out from the HIP-treated additive manufacturing product in the same manner as those of Examples 1, 2, and 4.

Comparative Example 3

A additive manufacturing product was prepared in the same manner as those of Examples 1, 2, and 4 by an electron beam method using the titanium alloy powder (Ti-6Al-4V) having the particle size (50% cumulative particle size and particle size range) shown in Table 1, manufactured by a rotating electrode method, and a tensile test piece and a fatigue test piece were cut out from the additive manufacturing product in the same manner as those of Examples 1, 2, and 4.

A tensile test and a fatigue test were performed on the tensile test pieces and the fatigue test pieces of Examples 1 to 4 and Comparative Examples 1 to 3 described above, and the results shown in Table 1 were obtained.

facturing conditions of a preheating temperature of 730° C., an output of 240 to 1,260 W, and a scanning speed of 350 to 3,800 mm/s using A2X manufactured by Arcam as an electron beam apparatus.

The laser additive manufacturing method performed in Example 3 was performed under the additive manufacturing conditions of an output of 400 W and a scanning speed of 600 to 1,300 mm/s without preheating using M2 manufactured by CONCEPT LASER as a laser apparatus.

The HIP treatment in Comparative Example 2 was performed under the condition in which an argon gas atmosphere of 100 MPa was maintained at 920° C. for 2 hours.

The powder particle size distribution measurement was performed by a laser diffractometer manufactured by Microtrac.

The measurement of the number of pores in the additive manufacturing product was performed by observing a cross section of the additive manufacturing product using a ste-

TABLE 1

| | Unit | | Content rate of powders having pores with respect to 1,000 powders (%) | Composition of titanium alloy | Particle size in which cumulative proportion of metal powder is 50% μm | Metal powder range μm | Method of producing metal powder | Metal additive manufacturing method | Pore content in metal additive manufacturing product (Number/mm$^2$) | HIP treatment | Fatigue strength for $10^7$ MPa | Tensile strength MPa |
|---|---|---|---|---|---|---|---|---|---|---|---|---|
| Example | 1 | | 0.03 | Ti-6Al-4V | 102 | 45-150 | Rotating electrode method | Electron beam | 0.02 | Not performed | 605 | 1050 |
| | 2 | | 0.07 | Ti-6Al-4V | 115 | 40-220 | Rotating electrode method | Electron beam | 0.03 | Not performed | 590 | 1030 |
| | 3 | | 0.03 | Ti-6Al-4V | 60 | 30-150 | Rotating electrode method | Laser | 0.02 | Not performed | 592 | 1020 |
| | 4 | | 0.09 | Ti-6Al-4V | 127 | 55-230 | Rotating electrode method | Electron beam | 0.05 | Not performed | 550 | 1000 |
| Comparative Example | 1 | | 0.18 | Ti-6Al-4V | 60 | 40-120 | Gas atomization method | Electron beam | 0.12 | Not performed | 400 | 900 |
| | 2 | | 0.18 | Ti-6Al-4V | 60 | 40-120 | Gas atomization method | Electron beam | 0.02 | Performed | 600 | 800 |
| | 3 | | 0.12 | Ti-6Al-4V | 140 | 70-250 | Rotating electrode method | Electron beam | 0.07 | Not performed | 470 | 950 |

Note that the rotating electrode method for producing the powder used in each of Examples 1 to 4 and Comparative Example 3 is a method of producing a spherical powder by melting an electrode rod as a raw material in a plasma arc while rotating the electrode rod in an inert atmosphere and scattering the melted electrode rod.

As for the composition of the titanium alloy powder (Ti-6Al-4V) produced by the rotating electrode method used in each of Examples 1 to 4 and Comparative Example 3, Al was 5.9 wt %, V was 4.1 wt %, Fe was 0.3 wt %, 0 was 0.10 wt %, N was 0.007 wt %, H was 0.007 wt %, and a balance was Ti.

In addition, as for the composition of the titanium alloy powder (Ti-6Al-4V) produced by the gas atomization method used in each of Comparative Examples 1 and 2, Al was 6.1 wt %, V was 4.0 wt %, Fe was 0.22 wt %, 0 was 0.075 wt %, N was 0.004 wt %, H was 0.004 wt %, and a balance was Ti.

The electron beam additive manufacturing method performed in each of Examples 1, 2, and 4 and Comparative Examples 1 to 3 was performed under the additive manureoscopic microscope (5 to 20 magnifications). That is, the additive manufacturing product having a diameter of 18 mm and a length of 160 mm described above was cut at any three positions orthogonal to a length direction, and each cross section was observed with an appropriate magnification. The observation area was set to radius 9 mm×radius 9 mm×3.14× three surfaces=763 mm$^2$.

A proportion of the powders having pores in 1,000 powders was determined by embedding the powder in a resin and performing observation with an optical microscope. That is, a cylindrical frame is provided on a flat plate, the powder is sprayed into the cylindrical frame, and the resin is poured and solidified from above the powder. Then, the resin in which the metal powder was embedded was polished, the cross section thereof was arbitrarily imaged with an optical microscope, and the number of defective powders observed in the 1,000 powders was determined from the obtained photograph or image data.

The fatigue strength test was performed on a fatigue test piece (size: parallel part of 6φ×15 mm, total length of 150 mm) cut out from the additive manufactured round bar under uniaxial (tensile/tensile) conditions of a test frequency of 10 Hz and a stress ratio R of 0.1 using a hydraulic servo type fatigue tester (model 8801).

The tensile test was performed on a tensile test piece (size: parallel part of width 2 mm×thickness 1 mm×length 10 mm) cut out from the additive manufactured round bar under the condition of a strain rate of 1.5/(10,000 S) using Autograph AG-X plus manufactured by Shimadzu Corporation.

The following is apparent from the results shown in Table 1.

In Examples 1 to 4, since the pore content in the metal additive manufacturing product is 0.05 number/mm² or less, the fatigue strength for $10^7$ cycles is 550 MPa or more, which is high, and the tensile strength is 1,000 MPa or more, which is high.

In Examples 1 to 4, the pore content in the metal additive manufacturing product is 0.05 number/mm² or less, which is low, because the titanium alloy powder used as a raw material is produced by the rotating electrode method, and the proportion of the powders having pores is 0.1% or less, which is low. In this case, an additive manufacturing product having a pore content of 0.05 number/mm² or less is obtained by any additive manufacturing method of the electron beam method (Examples 1, 2, and 4) and the laser method (Example 3).

On the other hand, in Comparative Example 1, although the tensile strength is 900 MPa, which is relatively high, the pore content in the metal additive manufacturing product is 0.12 number/mm², which is high, and thus, the fatigue strength for $10^7$ cycles is 400 MPa, which is low. The pore content in the metal additive manufacturing product is 0.12 number/mm², which is high, because the titanium alloy powder used is produced by the gas atomization method, and the proportion of the powders having pores is 0.18%, which is high.

Unlike Comparative Examples 1 and 2, in Comparative Example 3, the titanium alloy powder used was produced by the rotating electrode method, but the particle size was adjusted by classification in order to increase the powder particle size and clarify the influence thereof. As a result, the proportion of the powders having pores was more than 0.1%, and as a result, the pore content in the metal additive manufacturing product was 0.12/mm², which was high. Therefore, the fatigue strength for $10^7$ cycles did not reach 500 MPa.

Note that, in Comparative Example 2, the titanium alloy powder used is produced by the gas atomization method, and the proportion of the powders having pores is 0.18% which is high, but the pore content in the metal additive manufacturing product is 0.02/mm², which is low, and thus, the fatigue strength for $10^7$ cycles is 600 MPa, which is high. This is because the HIP treatment is performed on the metal additive manufacturing product. However, since the HIP treatment is performed, the tensile strength is 800 MPa, which is lower than that of Comparative Example 1 in which the HIP treatment is not performed by 100 MPa.

Figure 2:
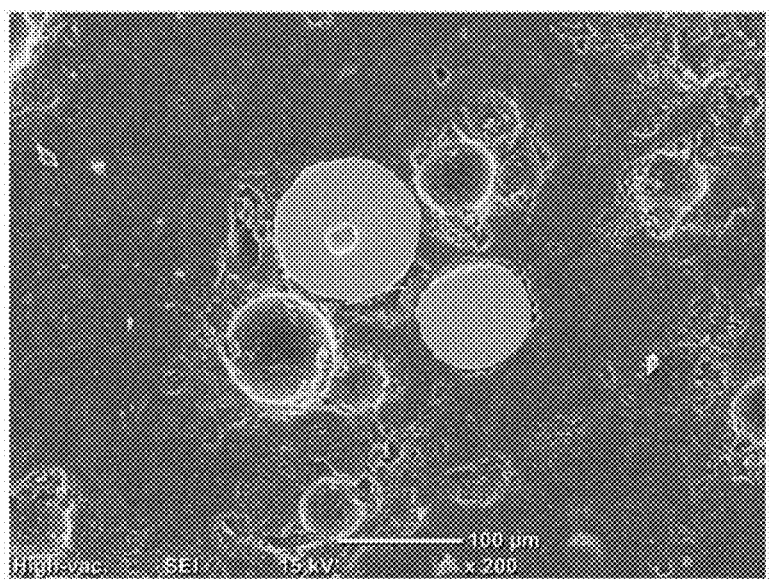
FIG. 2 is a view illustrating pores in a gas atomized powder.

FIG. 2 is a view illustrating pores in a gas atomized powder. The presence of pores containing gas in the powder is observed from FIG. 2.

Figure 3:
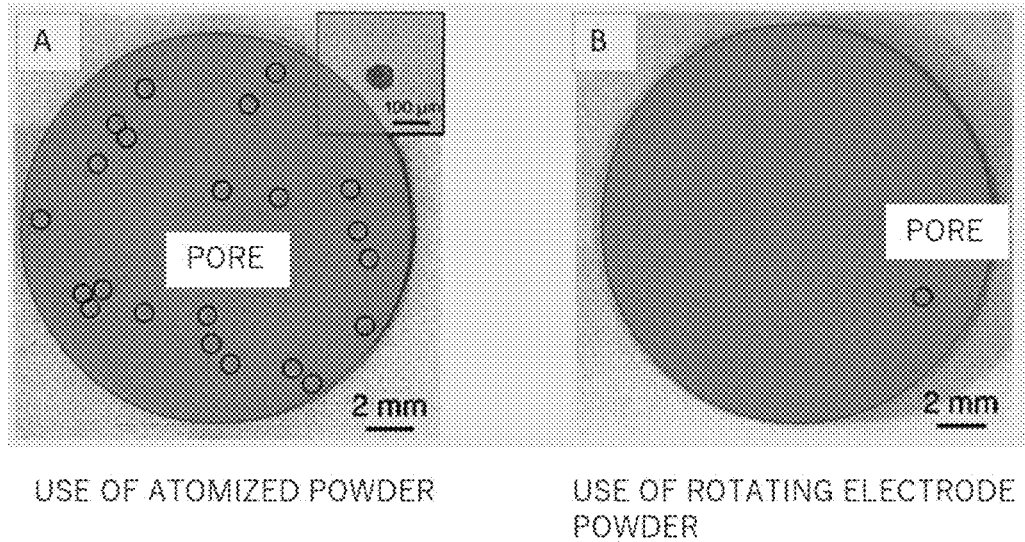
FIG. 3 is a view illustrating pores of an additive manufacturing product obtained using a gas atomized powder and an additive manufacturing product obtained using a powder obtained by a rotating electrode method.

FIG. 3 is a view illustrating pores of an additive manufacturing product (A) obtained using a titanium alloy powder by a gas atomization method and an additive manufacturing product (B) obtained using a titanium alloy powder obtained by a rotating electrode method. As illustrated in FIG. 3, only one pore is observed in the additive manufacturing product (A) obtained using the titanium alloy powder obtained by the rotating electrode method, although this is an example. On the other hand, a large amount of pores (22 pores in φ17.2 mm) are confirmed in the additive manufacturing product (B) obtained using the titanium alloy powder obtained by the gas atomization method. It is considered that the pores in the additive manufacturing product are pores entrained in the powder illustrated in FIG. 2.

Figure 4:
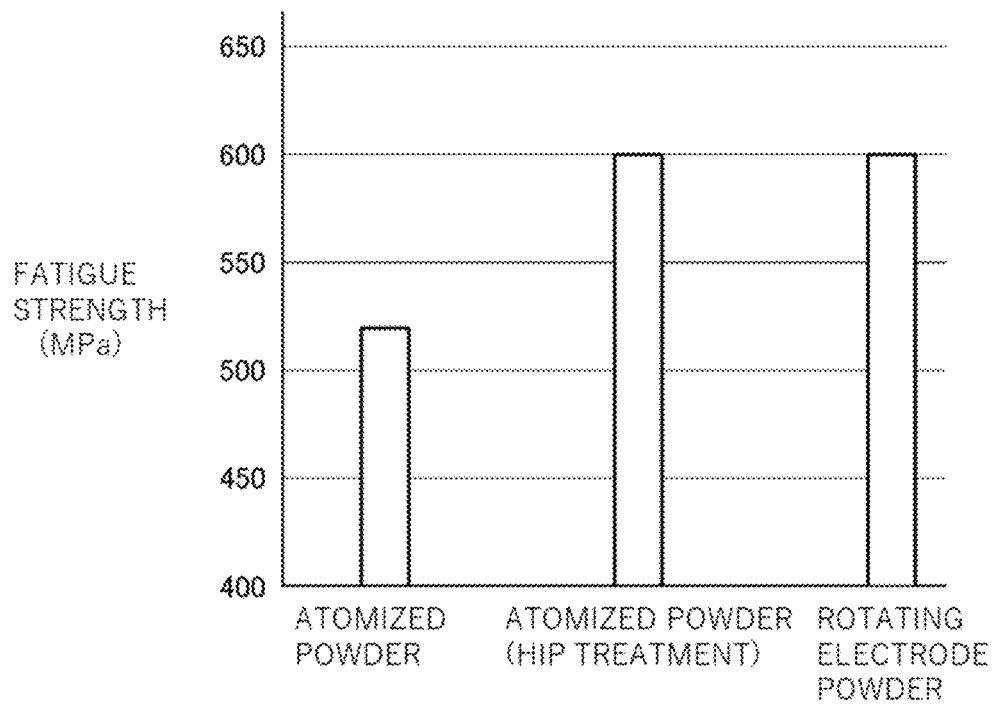
FIG. 4 is a view illustrating a fatigue strength (10$^7$ cycles) of a 6Al-4V titanium alloy.

FIG. 4 illustrates the fatigue strength ($10^7$ cycles) of the titanium alloy (Ti-6Al-4V). FIG. 4 illustrates that the additive manufacturing product (each of Examples 1 to 4, absence of HIP) obtained using the rotating electrode powder exhibits a higher fatigue strength ($10^7$ cycles) than that of the additive manufacturing product (Comparative Example 1, absence of HIP) obtained using the atomized powder and exhibits the same fatigue strength ($10^7$ cycles) as that of the additive manufacturing product (Comparative Example 2, absence of HIP) obtained using the atomized powder.

The invention claimed is:

1. A method of manufacturing a titanium alloy product from titanium alloy powder by an additive manufacturing method, the method comprising additive manufacturing with a titanium alloy powder in which a proportion of particles of the titanium alloy powder having pores is 0.1% or less, the titanium alloy powder being produced using a rotating electrode method in an inert gas atmosphere at 1 to 2 atm,
    the titanium alloy product containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities,
    wherein a pore content in a cross section of the product is 0.05 number/mm² or less,
    wherein a tensile strength of the product is 855 MPa or more, and
    wherein a fatigue strength for $10^7$ cycles of the product is 500 MPa or more.

2. The method of manufacturing a titanium alloy product according to claim 1, wherein a particle size of the titanium alloy powder is 30 to 250 μm.

3. The method of manufacturing a titanium alloy product according to claim 1, wherein the method is carried out without performing a Hot Isostatic Pressing (HIP) treatment.

* * * * *